United States Patent
Glueck

(10) Patent No.: US 7,609,740 B2
(45) Date of Patent: Oct. 27, 2009

(54) METHOD AND ARRANGEMENT FOR THE EXCITATION OF A GAS LASER ARRANGEMENT

(75) Inventor: Michael Glueck, Freiburg (DE)

(73) Assignee: HUETTINGER Elektronik GmbH + Co. KG, Freiburg (DE)

( * ) Notice: Subject to any disclaimer, the term of this patent is extended or adjusted under 35 U.S.C. 154(b) by 35 days.

(21) Appl. No.: 11/934,994

(22) Filed: Nov. 5, 2007

(65) Prior Publication Data

US 2008/0107142 A1  May 8, 2008

(30) Foreign Application Priority Data

Nov. 4, 2006  (DE) .................. 10 2006 052 060

(51) Int. Cl.
*H01S 3/223* (2006.01)
*H01S 3/09* (2006.01)

(52) U.S. Cl. .............. 372/55; 372/57; 372/90
(58) Field of Classification Search ............ 372/25, 372/28, 55, 57, 62, 90, 29.016, 32, 38.02, 372/38.04, 38.05
See application file for complete search history.

(56) References Cited

U.S. PATENT DOCUMENTS 4,494,236 A * 1/1985 Sutter, Jr. .................. 372/25
4,618,961 A * 10/1986 Sutter, Jr. .................. 372/87
4,823,350 A 4/1989 Yamazaki
2005/0088855 A1 4/2005 Kirchmeier et al.

FOREIGN PATENT DOCUMENTS

| DE | 261 675 | 11/1988 |
| DE | 102004023750 | 12/2005 |
| EP | 0 313 664 | 4/1988 |
| EP | 0 315 691 | 4/1988 |
| EP | 0 933 843 | 10/2002 |
| EP | 1 667 291 | 6/2006 |
| EP | 1667291 | * 6/2006 |

OTHER PUBLICATIONS

Office Action from corresponding German application No. 10 2006 052 060.2-54, mailed Apr. 23, 2007 from German patent office, 3 pages.
English translation of Office Action from corresponding German application No. 10 2006 052 060.2-54, mailed Apr. 23, 2007 from German patent office, 2 pages.

* cited by examiner

*Primary Examiner*—Armando Rodriguez
(74) *Attorney, Agent, or Firm*—Fish & Richardson P.C.

(57) ABSTRACT

For exciting a gas laser arrangement with a plurality of HF signals, at least two pulsed HF signals are generated arid at least two electrodes or pairs of electrodes of the gas laser arrangement are supplied with the pulsed HF signals, respectively. At least two of the electrodes or pairs of electrodes are supplied with pulsed HF signals that are phase-shifted with respect to each other.

16 Claims, 4 Drawing Sheets

METHOD AND ARRANGEMENT FOR THE EXCITATION OF A GAS LASER ARRANGEMENT

CROSS REFERENCE TO RELATED APPLICATION

This application claims priority under 35 U.S.C. §119(a) to German Patent Application DE 10 2006 052 060.2, filed Nov. 4, 2006, the contents of which are hereby incorporated by reference.

1. Technical Field

The invention relates to the excitation of a gas laser arrangement.

2. Background

HF power generators are used for laser excitation and operated at a frequency of 13.56 MHz. A pulse-mode operation is used for the power control, i.e., the laser power with a fundamental frequency of 13.56 MHz is switched on and off in a pulsating manner with a pulse frequency of, for example, 10 Hz to 100 kHz. The maximum pulse frequency is dependent on the fundamental frequency and cannot be arbitrarily increased, especially because the generator requires a certain amount of time for transient phenomena when pulsing.

Such an HF power generator is known for example from U.S. Publication No. 2005/0088855 A1, which discloses a single power generator that generates the excitation power. The excitation power is distributed with splitters to the individual electrodes on the gas laser tube.

It is known from U.S. Pat. No. 4,823,350, for example, to provide a plurality of electrodes on a gas laser tube, each electrode being assigned to its own HF generator.

SUMMARY

In general, in a first aspect, the invention features a method for exciting a gas laser arrangement with a plurality of HF signals that includes generating at least two pulsed HF signals, supplying at least two electrodes (or pairs of electrodes) of the gas laser arrangement with the pulsed HF signals, respectively, and wherein at least two of the electrodes (or pairs of electrodes) are supplied with pulsed HF signals that are phase-shifted with respect to each other.

In another aspect, a laser excitation arrangement includes a gas laser arrangement with a plurality of electrodes (or pairs of electrodes) for the power supply of the gas laser arrangement, at least two HF generators for generating at least one HF signal, wherein each of the HF generators is connected to one or several electrodes (or pairs of electrodes), respectively, and at least one pulse device for pulsing HF signals, such that at least two electrodes (or pairs of electrodes) are supplied with pulsed HF signals that are phase-shifted with respect to each other.

Implementations may include one or more of the following features. The phase-shifted pulsed HF signals can be generated by driving HF generators phase-shifted with a pulse frequency. Alternatively, additionally, the phase-shifted pulsed HF signals can be generated by switching an HF signal time-shifted to different electrodes (or pairs of electrodes).

In some embodiments, a HF generator can generate one of the at least two pulsed HF signals and supply one or several electrodes (or pairs of electrodes) with the pulsed HF signal.

In some embodiments, all of the electrodes (or pairs of electrodes) are supplied with pulsed HF signals that are phase-shifted with respect to each other.

The method can further include setting a duty cycle and/or a pulse frequency of at least one pulsed HF signal. Alternatively, or additionally, the method can include setting a phase shift between the pulsed HF signals.

For example, setting the duty cycle, a pulse frequency, and/or the phase shift can be based on an actual power delivered into the gas laser arrangement and a setpoint power to be delivered.

In some embodiments of the laser excitation arrangement, one electrode (or a pair of electrodes) can be assigned to each of the HF generators.

In some embodiments, the laser excitation arrangement can further include a control device for driving the at least one pulse device, a power measuring device for measuring the laser power, which is connected to the control device, a common DC power supply unit for a plurality of HF generators, a power setting element connected to the common DC voltage, said power setting element being assigned to each HF generator, and/or a power factor correction element for generating a common DC voltage.

In some embodiments, the at least one pulse device is operable to generate a signal with a pulse frequency and to drive at least one of the HF generators.

The HF frequency can be generated in a range of 1-10 MHz. For example, at least one of the HF generators is operable to generate an HF signal in a range of 1-10 MHz.

In some embodiments, at least one electrode of the plurality of electrodes is constructed as an electrode pair, i.e. pair of electrodes.

The method and the device described herein enable an operation mode of a laser arrangement, with which a low ripple of the laser power can be achieved.

In one general aspect of the method, at least two pulsed HF signals are generated and at least two electrodes or pairs of electrodes of a gas laser arrangement are supplied in each case with a pulsed HF signal, wherein at least two electrodes or pairs of electrodes are supplied with pulsed HF signals that are phase-shifted with respect to one another. For example, at least two pulsed HF signals are generated and are delivered with a time-offset to at least two electrodes or pairs of electrodes. As a result of the time-offset of the pulsed HF signals, tone can use relatively low pulse frequencies for the pulsing of the HF signals. This in turn makes it possible to use HF generators with a relatively low fundamental frequency, in particular <10 MHz. Such HF generators can be constructed with lower-cost driver modules and output amplifiers. It is possible to achieve laser power with a low ripple. This means that the (low) pulse frequency in a laser weld seam is no longer visible.

The ripple is reduced not only at the output (=laser), but also at the input of the HF generator. This can be advantageous when the power supply system is loaded in a pulsed manner. A heavy pulsed load of a power supply system impacts the voltage in the power supply system. As a result, other devices also connected to the power supply system may be disturbed.

In some embodiments, the phase-shifted pulsed HF signals can be generated by driving HF generators, which generate the HF signals, with a pulse frequency and a phase-shift. The individual power generators are operated at a relatively low fundamental frequency, e.g., 3.39 MHz, and are pulsed at a relatively low pulse frequency of, e.g., 25 kHz. The pulsing does not, however, take place simultaneously, but phase-shifted. I.e., the HF generators are driven with a phase-shifted pulse frequency. By this measure, the ripple of the output power, i.e. the laser power, can be reduced.

In some embodiments, a HF generator supplies one or several electrodes or pairs of electrodes with a pulsed HF signal. When a plurality of electrodes or pairs of electrodes is supplied by a single HF generator, the number of required HF generators can be reduced. In this case, however, the pulsed HF signals for some of the electrodes are not phase-shifted, and the pulse frequency and thus the fundamental frequency cannot be reduced as much as in the case of HF generators, each of which is feeding only one electrode or pair of electrode.

In some embodiments, all the electrodes or pairs of electrodes can be supplied with HF signals phase-shifted pulsed with respect to one another. This can be achieved by assigning one HF generator to one electrode or one pair of electrodes, so that the pulsed HF signals of all of the electrodes or pairs of electrodes are time-shifted.

In some embodiments, the phase-shifted pulsed HF signals can be generated by switching a HF signal time-delayed to different electrodes or pairs of electrodes. This can be achieved, for example, by providing an HF switch at the output of the HF generator and switching the HF switch with the pulse frequency.

In some embodiments, the duty cycle of at least one pulsed HF signal can be set. Thereby, the power delivered by the HF generator and thus also the laser power can be adjusted. For example, a more precise matching of an actual power to a setpoint power can be achieved. Preferably the duty cycle of each pulsed HF signal can be adjusted. For example, it is possible to provide different duty cycles for the pulsed HF signals generated by different HF generators, such that a lower ripple of the laser power is achieved.

Alternatively, or additionally, setting the power delivered by an HF generator and thus also the laser power can include setting the pulse frequency of at least one pulsed HF signal. A pulse frequency can be set in the range of 0.05 Hz-30 kHz, for example, in the range of 0.1 Hz-25 kHz.

Alternatively, or additionally, the method can include setting the laser power by setting the phase shift between the pulsed HF signals.

The setting of the duty cycle, the pulse frequency and/or the phase shift can be based on an actual power delivered into the gas laser arrangement and a setpoint power to be delivered. This means that the actual power can be detected or registered. The power can be adjusted with a control device to which the actual power is fed. The ripple of the output power, or more precisely, the laser power, can be reduced by the power setting. By an appropriate setting one can ensure that the ripple in the power supply system is also low. Moreover, for the setting of the ripple, the control device can detect or calculate the best possible drive parameter(s) for the desired power.

The HF signals can be generated at a frequency in the range of 1-10 MHz. The HF generators, which generate the HF signals, can thus be built cost-effectively.

In another aspect, a laser excitation arrangement includes a gas laser arrangement with plural electrodes or pairs of electrodes for the power supply of the gas laser arrangement, at least two HF generators generating each at least one HF signal, to which one or several electrodes or pairs of electrodes are connected, respectively. Furthermore, the laser excitation arrangement includes at least one pulse device for pulsing of HF signals, wherein at least two electrodes or pairs of electrodes are supplied with pulsed HF signals that are phase-shifted with respect to one another. In such a laser excitation arrangement, the HF generators can be operated at a low fundamental frequency and at a relatively low pulse frequency, such that the HF generators can be built cost-effectively.

In some embodiments, an electrode or a pair of electrodes can be assigned to each HF generator. All of the electrodes or pairs of electrodes can thus be supplied with HF signals which are pulsed with a delay in time. Thus, the ripple of the laser power can be reduced considerably.

Some embodiments include a control device that drives the at least one pulse device. Due to this measure, it is possible to set the pulse frequency for the pulsed HF signals. The laser power, but also the ripple of the laser power, can thus be controlled. The control device cannot only drive the pulse device(s) but also all of the HF generators. Furthermore, the pulse devices can be arranged in the HF generators.

In some embodiments, the at least one pulse device generates a signal with a pulse frequency and thus drives at least one HF generator. Thus, a pulsed HF signal can be easily generated. In some embodiments, the pulse frequency lies in the range of 0.05 Hz-30 kHz, for example, in the range of 0.1 Hz-25 kHz.

Some embodiments include a power measuring device for measuring the laser power, which is connected to the control device. Based on feedback from the power measuring device, to the control device can drive the HF generators in such a way that a good matching of the actual power to the setpoint power is achieved.

Some embodiments include a common DC power supply unit for a plurality of HF generators, which is cost reducing. Because, for example, the laser power can be adjusted with the pulse frequency, a setting capability for the DC voltage is not required for adjusting the laser power. For example, all of the HF generators can be supplied with the same DC voltage.

In some embodiments, a power factor correction element (PFC element) can be provided to generate a common DC voltage. Then, one connects the laser excitation arrangement to different power supply systems.

Moreover, a power setting element connected to the common DC voltage can be assigned to the HF generator. The power setting element can be a DC/DC transformer, for example, a step-down converter or a step-up converter. When a high DC voltage, for example 750 V, is generated by the PFC element, a step-down converter can be used as the power setting element. The power generated in the assigned HF generator can be adjusted by changing the output voltage of the power setting element. Thus, the power for each HF generator can be adjusted separately. Different power can thus be coupled into different discharge paths, or sections of the discharge path. This can be advantageous, for example, when sections of the discharge path have different thicknesses.

The HF generators can, for example, generate an HF signal in the range of 1-10 MHz.

Further features and advantages are obtained from the following description with reference to the Figures in the drawings, which show details, and from the claims. The features mentioned above and below can be utilized individually or collectively in arbitrary combination. The embodiments shown and described are not to be understood as exhaustive enumeration but have exemplary character for describing the invention.

DESCRIPTION OF DRAWINGS

Like reference symbols in the various drawings indicate like elements.

DETAILED DESCRIPTION

Figure 1:
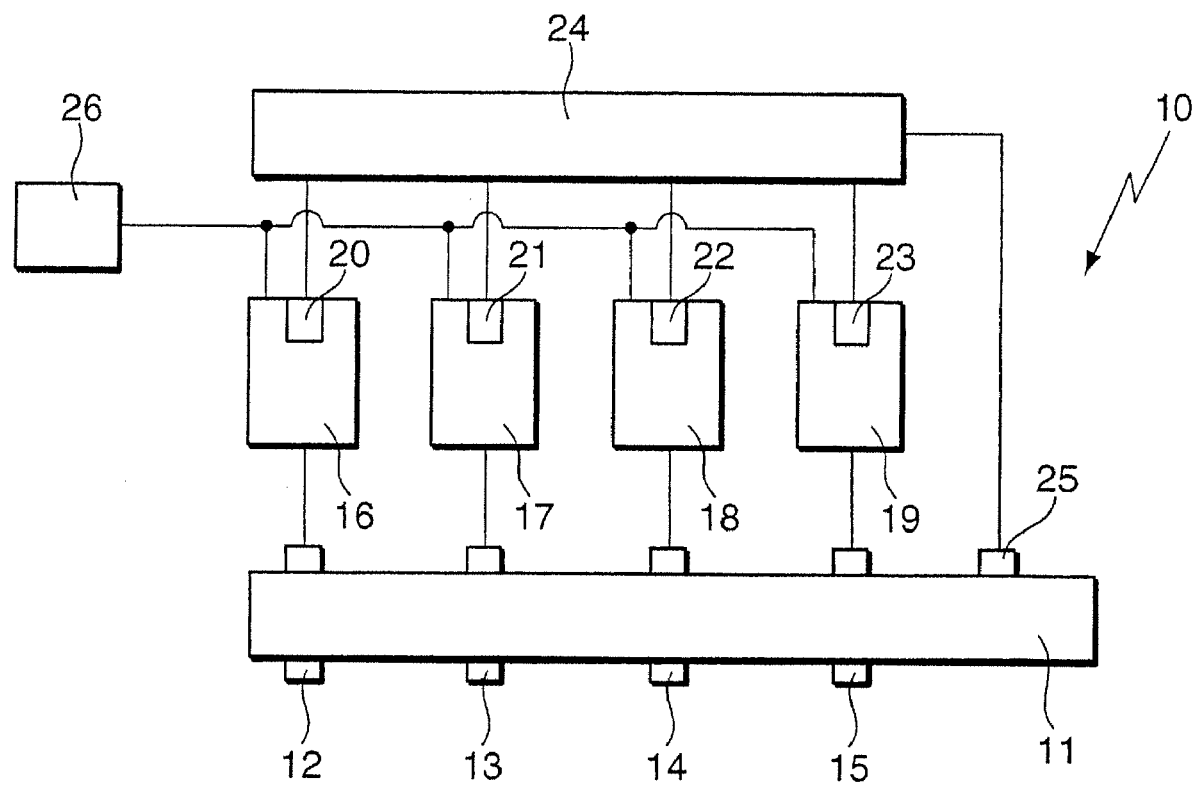
FIG. 1 is a first block diagram of a laser excitation arrangement.

FIG. 1 shows a laser arrangement 10 with a gas laser arrangement 11. The gas laser arrangement 11 includes four pairs of electrodes 12-15 that feed in power for the operation of the gas laser arrangement 11. The pairs of electrodes 12-15 are assigned to HF generators 16-19, respectively, and are fed by the latter with pulsed HF signals. One generates the pulsed HF signals by pulsing HF signals generated at a fundamental frequency with a pulse frequency within the HF generators 16-19. The pulse frequency originates from pulse devices 20-23, which switch the HF generators essentially at the pulse frequency on and off. Thereby, an HF signal is transmitted to the assigned pair of electrodes 12-15 only when the HF generator is switched on. The switching-on and switching-off for different HF generators 16-19 is shifted in time. This means that time-shifted and accordingly phase-shifted pulsed HF signals are generated and delivered to the pairs of electrodes 12-15. The ripple of the laser power can be reduced by this measure.

The pulse frequency and also the time shift (phase shift) are set by a common control device 24, which drives the HF generators 16-19 and accordingly the pulse devices 20-23. The control device 24 controls also the duty cycle of the pulse signals, i.e., the ratio of the switch-on duration to the switch-off duration of an HF generator during the pulse signal period. The pulse frequency, the duty cycle and the time shift are set with the control device 24 such that the pre-selected setpoint power and a low ripple of the output laser power are achieved. The HF generators 16-19 can be driven with different pulse frequencies and duty cycles, so that each of them delivers a different power. In order to be able to match the actual power as closely as possible to the setpoint power, a power measuring device 25 is provided.

The HF generators 16-19 are supplied with power with a common DC power supply 26 designed as a DC power supply unit. The laser excitation arrangement 10 is constructed in a modular fashion. This means that an arbitrary number of HF generators 16-19 can be used depending on the power class of the laser. Power setting elements (not shown) can also be used to regulate the power. A power setting element can be positioned upstream of one of the HF generators 16-19 and connected to the DC power supply 26.

FIGS. 2a-2f show exemplary output signals M1-M4 (corresponding to the pulsed HF signals) of HF generators 16-19 as well as a cumulative output power S.

Figure 2A:
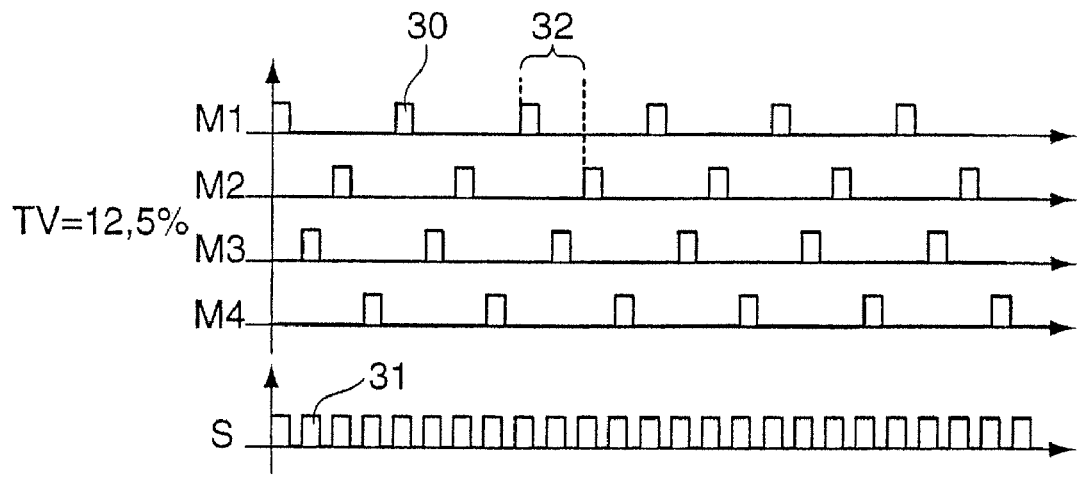
FIGS. 2a-2f are diagrams of pulsed HF signals generated by four HF generators and of the resulting output power.

For simplification, it is assumed that all HF generators 16-19 are driven with the same pulse frequency. In FIG. 2a, a duty cycle TV of 12.5% has been selected. This means that HF generators 16-19 are switched on only during 12.5% of the duration of the pulse signal period. The switch-on pulses are designated with reference numeral 30. In FIG. 2a, the HF generators 16-19 are switched on at different times for an identical time period. Due to the low duty cycle, i.e., the short switch-on time of the HF generators 16-19, a pulsed cumulative output power S results. The time periods are selected such that power pulses 31 have the same length in time. The distance in time of the rising sides is indicated by a phase shift 32, and accordingly a time shift or delay, between two pulsed HF signals.

Figure 2B:
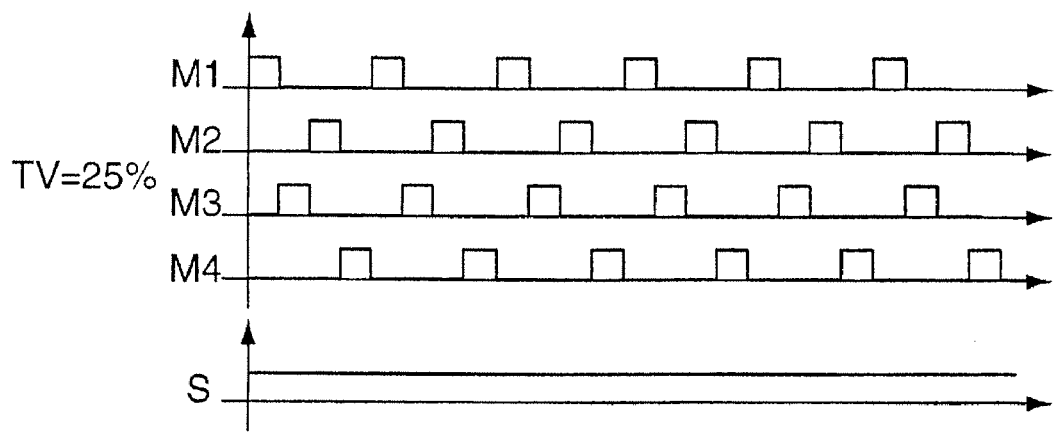

In FIG. 2b, a duty cycle TV of 25% is selected. The phase shift of signals M1-M4 is selected such that a continuous cumulative output power S is generated. In FIGS. 2a and 2b, the two HF generators 16-19 are never switched on at the same time.

Figure 2C:
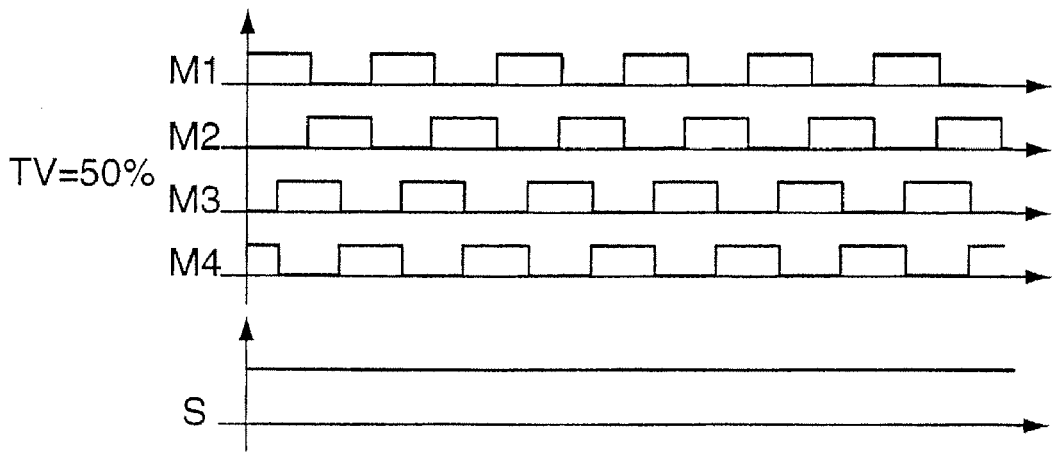

In FIG. 2c, the pulse signals exhibit a duty cycle TV of 50%, so that HF generators 16-19 are always switched on for half of a period of the pulse signal and are switched off for the other half of the period. Because, in this case, two HF generators 16-19 are always switched on at the same time, the cumulative output power S is twice as much as the cumulative output power S of FIG. 2b.

Figure 2D:
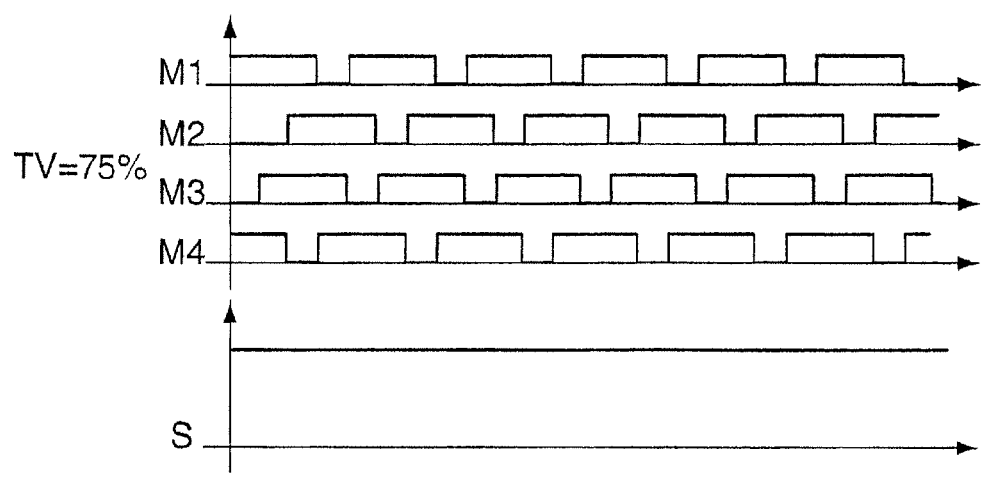

A threefold increase in cumulative output power S is shown in FIG. 2d corresponding to a duty cycle TV of 75%.

Figure 2E:
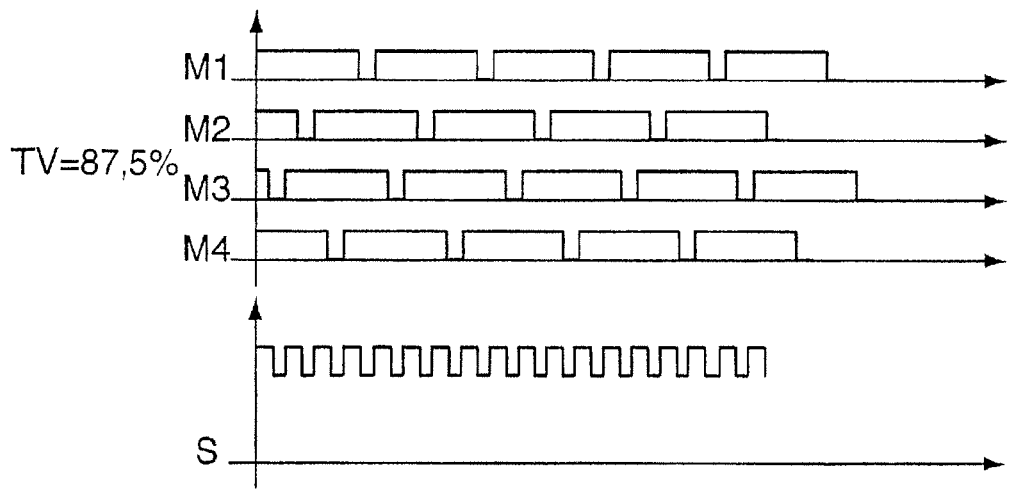

In the representation of FIG. 2e, a duty cycle TV of 87.5% is selected. In this case, the cumulative output signal exhibits a ripple.

Figure 2F:
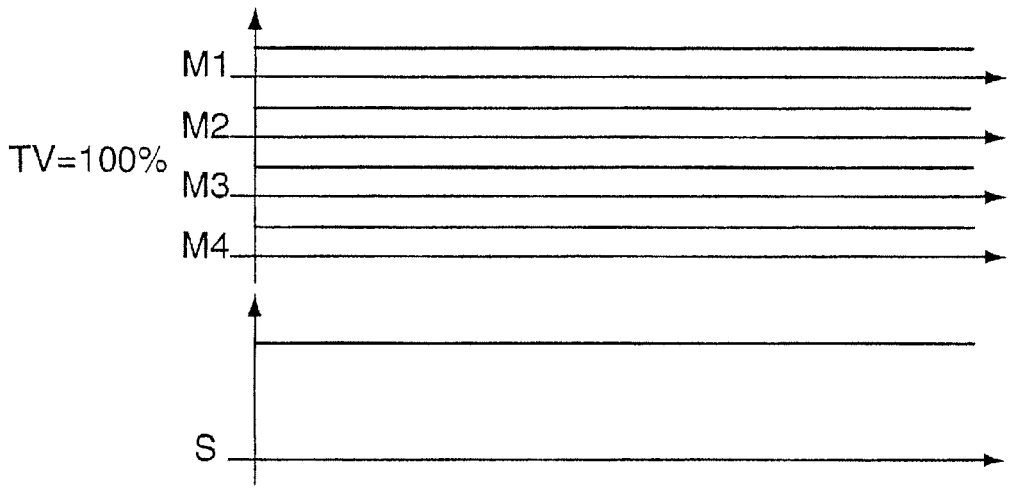

In FIG. 2f, HF generators 16-19 are permanently switched on with a duty cycle TV of 100%, such that HF signals are is continuously delivered to the pairs of electrodes 12-15. In this case the largest cumulative output power S is achieved.

Figure 3:
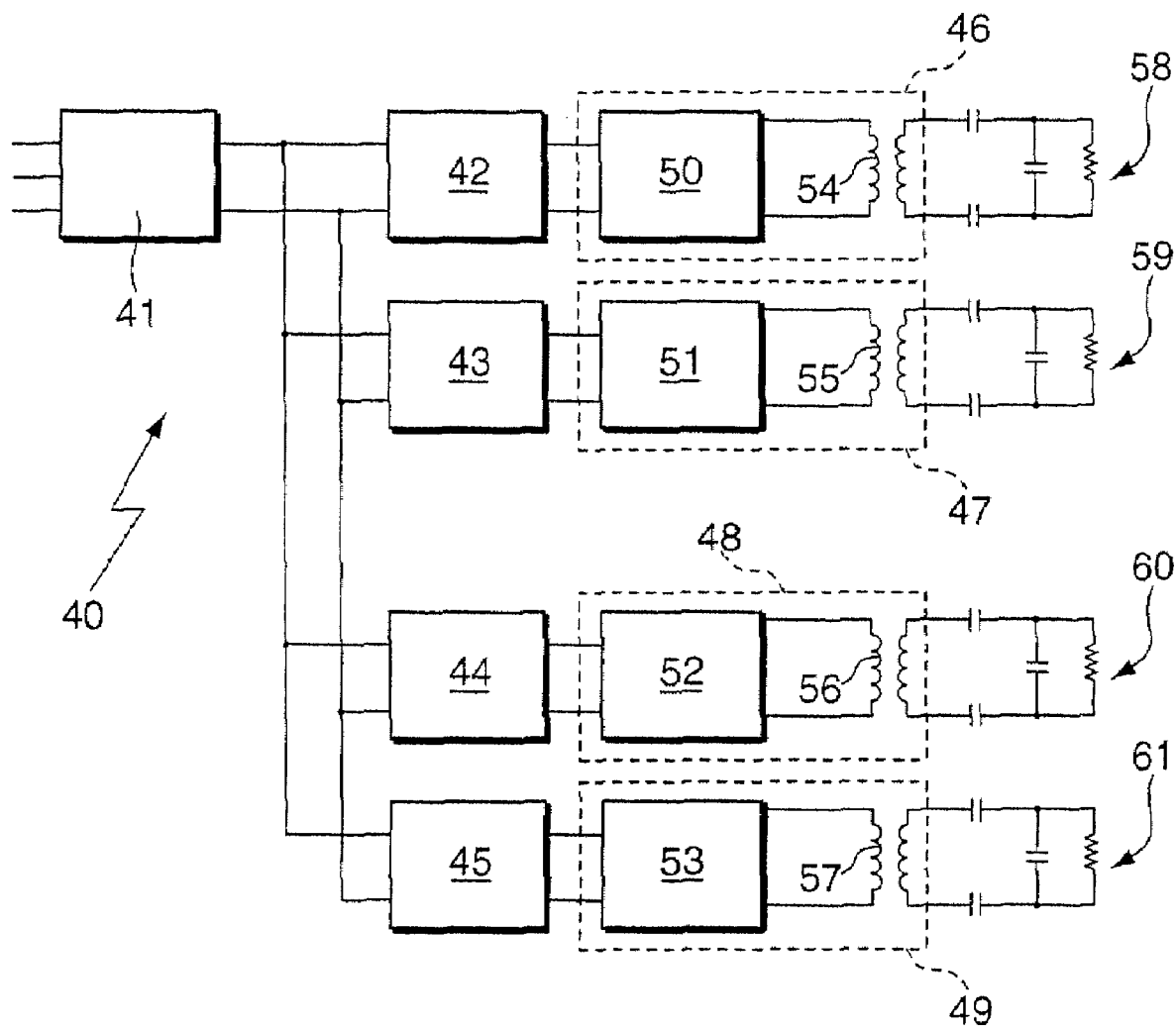
FIG. 3 is a second block diagram of a laser excitation arrangement.

In the case of a laser excitation arrangement 40, which is shown in FIG. 3, a central PFC element 41 can be connected to a voltage supply system (not shown) and transform the supply voltage into a common DC voltage. Power setting elements 42-45 designed as step-down converters are connected to PFC element 41 and thus to the common DC voltage. The power setting elements 42-45 are also driven by a control device (not shown), such that the output voltage of power setting elements 42-45 is adjustable. The power generated by HF generators 46-49 is adjustable, and accordingly can be regulated.

Each of the HF generators 46-49 includes a HF switching stage 50-53 and an output transformer 54-57, respectively. The output transformers 54-57 transform the output voltage to appropriate values for each of the discharge path sections 58-61, which are shown exemplary as equivalent circuit diagrams.

A number of embodiments of the invention have been described. Nevertheless, it will be understood that various modifications may be made without departing from the spirit and scope of the invention. Accordingly, other embodiments are within the scope of the following claims.

What is claimed is:

1. A method for exciting a gas laser arrangement with a plurality of HF signals, the method comprising:
   generating at least two pulsed HF signals;
   supplying at least two electrodes of the gas laser arrangement with the pulsed HF signals, respectively, wherein at least two of the at least two electrodes are supplied with pulsed HF signals that are phase-shifted with respect to each other; and
   setting at least one of a duty cycle for at least one of the at least two pulsed HF signals, a pulse frequency for at least one of the at least two pulsed HF signals, and a phase shift between at least two of the at least two pulsed HF signals based on matching an actual power delivered into the gas laser arrangement to a setpoint power to be delivered.

2. The method of claim 1, wherein the phase-shifted pulsed HF signals are generated by driving HF generators phase-shifted with a pulse frequency.

3. The method of claim 1, wherein an HF generator generates one of the at least two pulsed HF signals and supplies one or several electrodes or pairs of electrodes with the pulsed HF signal.

4. The method of claim 1, wherein all of the electrodes or pairs of electrodes are supplied with pulsed HF signals that are phase-shifted with respect to each other.

5. A method for exciting a gas laser arrangement with a plurality of HF signals, the method comprising:

generating at least two pulsed HF signals, and supplying at least two electrodes of the gas laser arrangement with the pulsed HF signals, respectively, wherein at least two of the at least two electrodes are supplied with pulsed HF signals that are phase-shifted with respect to each other, wherein the phase-shifted pulsed HF signals are generated by switching an HF signal time-shifted to different electrodes or pairs of electrodes.

6. The method of claim 1, wherein the HF frequency is generated in a range of 1-10 MHz.

7. A laser excitation arrangement, comprising:

a gas laser arrangement with a plurality of electrodes for the power supply of the gas laser arrangement, at least two HF generators for generating at least one HF signal, wherein each of the HF generators is connected to one or several electrodes, respectively, and at least one pulse device for pulsing HF signals, such that at least two electrodes are supplied with pulsed HF signals that are phase-shifted with respect to each other.

8. The laser excitation arrangement of claim 7, wherein one electrode is assigned to each of the HF generators.

9. The laser excitation arrangement of claim 7, further including a control device for driving the at least one pulse device.

10. The laser excitation arrangement of claim 7, wherein the at least one pulse device is operable to generate a signal with a pulse frequency and to drive at least one of the HF generators.

11. The laser excitation arrangement of claim 7, further including a power measuring device for measuring the laser power, the power measuring device being connected to the control device.

12. The laser excitation arrangement of claim 7, further including a common DC power supply unit for the at least two HF generators.

13. The laser excitation arrangement of claim 12, further including a power setting element connected to the common DC voltage, the power setting element being assigned to each HF generator.

14. The laser excitation arrangement of claim 7, further including a power factor correction element for generating a common DC voltage.

15. The laser excitation arrangement of claim 7, wherein at least one electrode of the plurality of electrodes is constructed as an electrode pair.

16. The laser excitation arrangement of claim 7, wherein at least one of the HF generators is operable to generate an HF signal in a range of 1-10 MHz.

\* \* \* \* \*

UNITED STATES PATENT AND TRADEMARK OFFICE
CERTIFICATE OF CORRECTION

PATENT NO. : 7,609,740 B2  Page 1 of 1
APPLICATION NO. : 11/934994
DATED : October 27, 2009
INVENTOR(S) : Michael Glueck It is certified that error appears in the above-identified patent and that said Letters Patent is hereby corrected as shown below:

Title pg, Item (57) Abstract, line 2, delete "arid" and insert --and--.

Signed and Sealed this
Eighteenth Day of January, 2011

David J. Kappos
*Director of the United States Patent and Trademark Office*